United States Patent [19]

Mlecka

[11] Patent Number: 5,431,467
[45] Date of Patent: Jul. 11, 1995

[54] COMBINED WEED EXTRACTOR, SEED PLANTER AND HOLE DIGGER

[76] Inventor: Louis F. Mlecka, 20481 Yontz Rd., Brooksville, Fla. 34601

[21] Appl. No.: 258,733

[22] Filed: Jun. 13, 1994

[51] Int. Cl.$^6$ ............................ A01B 1/16; A01C 5/02
[52] U.S. Cl. ........................................ 294/51; 111/92; 111/106; 294/50.8
[58] Field of Search ................. 294/8.5, 11, 50.6–50.9, 294/51, 99.1, 99.2, 106; 111/101, 106, 107, 115, 92

[56] References Cited

U.S. PATENT DOCUMENTS

| | | | |
|---|---|---|---|
| 289,185 | 11/1883 | Visscher | 111/106 |
| 293,652 | 2/1884 | Gross | 111/101 |
| 537,525 | 4/1895 | Gasser | 111/92 |
| 901,279 | 10/1908 | Crenshaw | 111/101 |
| 909,289 | 1/1909 | Grisell et al. | 294/50.9 X |
| 974,077 | 10/1910 | Kleeberger | 111/106 |
| 1,288,194 | 12/1918 | Reeks | 294/50.8 X |
| 1,895,214 | 1/1933 | Stork | 294/50.8 X |
| 2,056,601 | 10/1936 | Cross | 294/50.8 |
| 2,421,821 | 6/1947 | Weite | 111/92 |
| 2,525,678 | 10/1950 | Hout | 294/50.8 |

FOREIGN PATENT DOCUMENTS

| | | | |
|---|---|---|---|
| 134621 | 10/1949 | Australia | 294/50.8 |
| 10504 | 1/1909 | United Kingdom | 294/50.8 |
| 853681 | 11/1960 | United Kingdom | 294/50.8 |

Primary Examiner—Johnny D. Cherry

[57] ABSTRACT

A lawn and gardening device for extracting weeds, digging holes, planting seeds, and other small excavations. The lawn and gardening device has a pair of jaws at one end to clamp onto a weed whereby the user first pulls outwards, and then upwards on a pair of handles provide to extract the weed. Holes are dug in the same fashion by simply repeating the above steps in the same location. Seeds are planted by placing a seed into an opening provided at the top end of the pole whereby the seed is guided down the hollow cavity of the pole into the mouth portion and into the hole. The lawn and gardening device comprises a pair of jaws, a pair of hollow poles, two handles, an opening at the top end of the poles, a flexible coupler and spacing means, and jagged teeth around the perimeter of each jaw.

7 Claims, 2 Drawing Sheets

COMBINED WEED EXTRACTOR, SEED PLANTER AND HOLE DIGGER

BACKGROUND OF INVENTION

This invention relates to an apparatus for use in lawn and gardening maintenance. More specifically, this invention eliminates the need for the user to bend over when extracting weeds, planting seeds, digging holes and other small lawn and gardening excavations. The lawn and gardening device comprises two hollow poles each having one half a jaw at one end forming a mouth to accept a weed or unwanted plant. A flexible coupler is used to hold the poles at the bottom end, and an opening is provided at the top end of one of the poles to allow seeds to be inserted. Additionally, a pair of handles are provided affixed to the top end of the poles thereby eliminating the need for the user to bend over.

It has been customary for the user to bend over and extract weeds from the lawn using their hands and then pulling the weeds out manually. This method falls short when the user has a hurt or weak back or when the weed is anchored strongly to the ground. An additional draw back is that this method is unsanitary and possibly dangerous when dealing with poisonous types of plant life. When planting seeds, the user must also bend over to dig holes and manually insert seeds into the ground.

Several approaches have been provided for, in San Filipo of U.S. Pat. No. 3,767,251, "A weed extracting device comprising a body member having a weed extracting member pivotally secured thereto and movable through an angle from an extended position, in which the extracting member is locked to the body member with its free end in substantial alignment therewith or offset at a small angle for insertion in the ground beneath a weed, to an extracting position, in which the extracting member is substantially at right angles to the body member, and extracts the weed from the ground." While this approach has its advantages, it lacks the ability to plant seeds without the user having to bend over and place the seed into the ground. Another inability of this weed extracting device is that it cannot dig symmetrical holes for installation of plants or posts. Additionally, this weed extraction device can extract unwanted vines from walls or trees.

Another approach is taught by Green, in U.S. Pat. No. 5,188,340 wherein, "A weed extraction device for digging, cutting, twisting and pulling out weeds. The weed extraction device includes a rod member from which a handle is formed by bending the rod member. The handle is useful in pushing the device into the ground and to twist the device to twist out the weeds and by which the user can pull out weed from the ground without bending over. The rod member also includes a foot step which is formed by bending the rod member and is useful in pushing the device into ground to the depth of the tap root. Attached permanently to the rod member is the root trap which is a half-cone or hemiconically shaped cutting, coring and compacting portion of the device. The root trap is useful to dig into the ground, cut a cone shaped plug, compact the tap root and branch roots and twist out the weed including the tap root which prevents the root from ever growing again. The cutting teeth of the root trap on the leading edge of the root trap cut the branch roots and free the branch roots from attachment to the soil. The twisting action of the handle, rod member and the root trap results in the twisting free of the weed. The device is used to pull the weed out of the ground from the standing, upright position with little effort or back-strain." This particular weed extracting device also lacks the ability to dig post holes for installation of posts or plants. Additionally, this device cannot plant seeds without the user having to bend over to place the seed on the ground. Furthermore, this device does not have the ability to extract vines from walls or trees.

Still another approach is taught in the art by Long, U.S. Pat. No. 3,847,226, wherein "A weeder tool for lawns, gardens and the like, which is operated by hand and foot of a standing operator or user, and includes a rigid, formed and shaped, tapered blade, having a curved and sliding fulcrum, a step for the operator's foot, and a sharp, bifurcated tip for engaging the weed root. The weeder tool also comprised a handle, the pulling of the upper end of which toward the operator from forwardly inclined position to an upright position, after having first pushed the tip and tongue of the blade into the ground by foot pressure on the step, advances the tip of the blade to the root of the weed and pivots the blade about its sliding fulcrum to break the ground adjacent the root crown, raise and break a divot, and push the weed, root and crown up and through the broken divot." A shortcoming of this approach is that it requires the user to have to find the buried root beneath the soil before it can be extracted and may cut the root instead of totally extracting it. Additionally, this device cannot plant seeds or dig post holes for small excavations or the like. Finally, this device is not able to remove vine type weeds from walls, trees, or any other type of vertical structure.

SUMMARY OF THE INVENTION

Accordingly, it is an object of this invention to provide a lawn and gardening device that will extract weeds without the user having to bend over at the waist. This invention has the ability to allow the user to press down on a pair of handles at the waist when extracting weeds.

Another object of this invention is to dig holes for small excavations or the like. Symmetrical holes can be dug to install small posts, plants or trees.

Still another object of this invention is to dig small holes while simultaneously planting seeds. An opening is provided adjacent the handles whereby the user inserts a seed. By pulling the handles outward, the closed jaws are pressed into the ground and then are pushed inward to open a hole in the ground. Next, the seed proceeds to fall down the hollow poles of the device to the ground and exits the poles at the mouth of the device and into the ground.

Still yet another object of this invention is to provide a pair of handles to allow the user to press down and twist on the handles. These handles allow the user to press down and twist the mouth or jaws of the device whereby the weed is loosened from the ground.

A further object of this invention is to provide a flexible coupler and spacing means that will not corrode or rust. This particular coupler acts as a spring to pull the handles of the lawn and gardening device back to a parallel position when there is no force applied to the handles.

Still a further object of this invention is to provide hollow poles to allow seeds to fall through the poles and exit through the mouth of the invention.

Another object of this invention is to provide jagged teeth at the perimeter of each jaw that will easily cut into the ground and grip the weeds for extraction. These teeth will facilitate the process by gripping the roots of the weeds for total extraction of the plant.

Still another object of this invention is to provide a pair of jaws that will interlock with each other when in a closed position. This interlocking effect will allow the jaws to grip the roots of weeds and plants in a scissor like fashion.

In carrying out this invention in the illustrative embodiment thereof, a lawn and gardening device is used for extracting weeds, digging holes, and planting seeds.

Conveniently, to extract weeds, the user may grip the handles and place the open mouth of the device over the weed to be extracted. Next the user presses down onto the handles thereby forcing the jaws of the mouth into the ground around the perimeter of the weed. The user then pulls and twists the handles apart thereby forcing the jaws of the device to grab the weed and the upward lift on the handles removes the weed from the soil. The user then pulls upwards on the handles while maintaining handle separation to extract the weed.

For planting seeds, the user first grips the handles and places the closed mouth of the device over the ground where the seed is to be planted. Next the user presses down onto the handles thereby forcing the closed jaws of the mouth into the ground. The user then pulls the handles inward thereby forcing the jaws of the device to open a hole in the ground. The seed proceeds to fall down the hollow pole and exits through the mouth of the device into the hole in the ground. The user then pulls out the device and steps on the planted area to insure permanent solid placement of the seed.

For digging deeper post holes, the user simply extracts enough dirt by gripping action until the hole is deep enough for installation of a post, plant, or small tree.

BRIEF DESCRIPTION OF THE DRAWINGS

This invention, together with other objects, features, aspects and advantages thereof, will be more clearly understood from the following description, considered in conjunction with the accompanying drawings.

Two sheets of drawings are furnished, sheet one contains FIG. 1 and FIG. 2 and sheet 2 contains FIG. 3.

DESCRIPTION OF THE PREFERRED EMBODIMENTS

Figure 1:
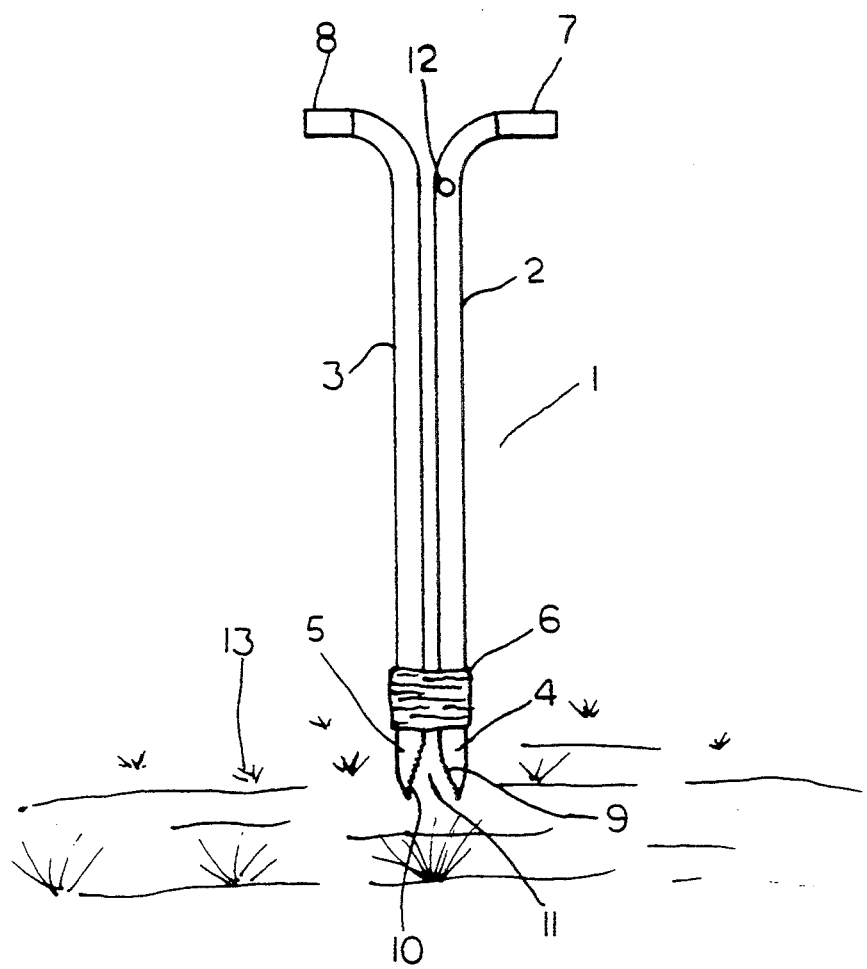
FIG. 1 is a composite view of the lawn and gardening device with an open mouth ready to accept a weed, seed, or dig a hole.

Referring now to FIG. 1, a lawn and gardening device referred to generally by the reference numeral 1 is made of a pair of hollow poles 2 and 3. The poles 2 and 3 each have a jaw 4 and 5 affixed to the bottom end of each pole. The bottom end of each pole 2 and 3 has a flexible coupler 6 consisting of non-corrosive suitable flexible coupler tubing of a certain thickness and length, said coupler 6 being slid down from the top and over both poles 2 and 3 and covering and holding said poles in place and allowing the pair of jaws 4 and 5 to swivel open and close and able to pull said poles back to a parallel position when no force is applied to handles 7 and 8. Said jaws 4 and 5 are non-symmetrical in size, allowing one said jaw to slide into the other said jaw a given distance. The perimeter of each jaw 4 and 5 has a row of jagged teeth 9 and 10 affixed thereto. The jaws 4 and 5 are arranged in a configuration to form an open mouth 11 that will accept a weed 13 or dig holes. The top end of poles 2 and 3 has a pair of handles 7 and 8 extending horizontally outward to allow the user to push down, pull up and possibly twist the jaws of the lawn and gardening device 1. Adjacent to the handle 7 is an opening 12 to allow a seed to be inserted into the pole 2 and exit through mouth 11.

Figure 2:
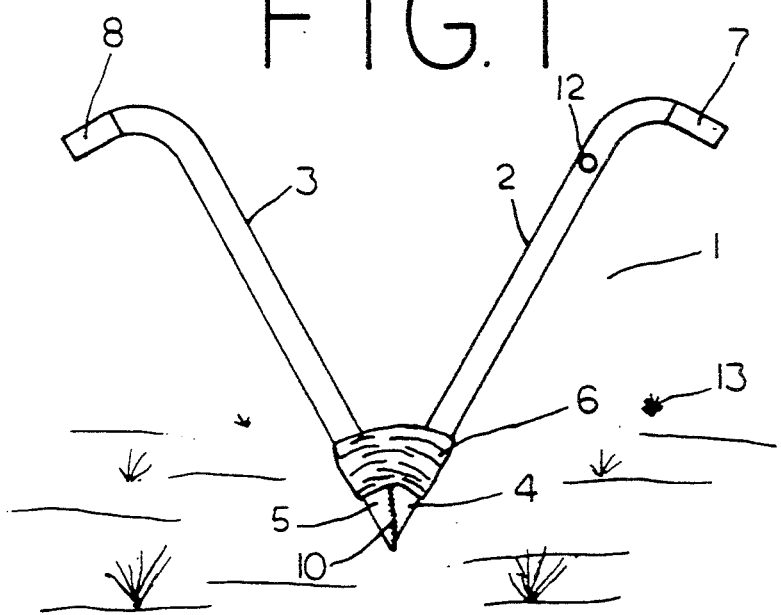
FIG. 2 is a composite view of the lawn and gardening device with a closed mouth clamped securely onto a weed or to dig a hole for planting a seed.

Referring now to FIG. 2, a lawn and gardening device referred to generally by the reference numeral 1 is made of a pair of poles 2 and 3. The poles 2 and 3 each have a jaw 4 and 5 affixed to the bottom end of each pole. The bottom end of each pole 2 and 3 has a flexible coupler 6 joining poles 2 and 3 allowing the pair of jaws 4 and 5 to open and close. The perimeter of jaw 5 has a row of jagged teeth 10 affixed thereto. The jaws 4 and 5 are arranged in a configuration of a closed mouth clamped onto a weed 13. The top end of poles 2 and 3 has a pair of hollow handles 7 and 8 extending horizontally outward to allow the user to push down and twist the jaws of the lawn and gardening device 1. At the end of hollow handle 7 is an opening 12 to allow a seed to be inserted into the pole 2 and exit through mouth 11.

Figure 3:
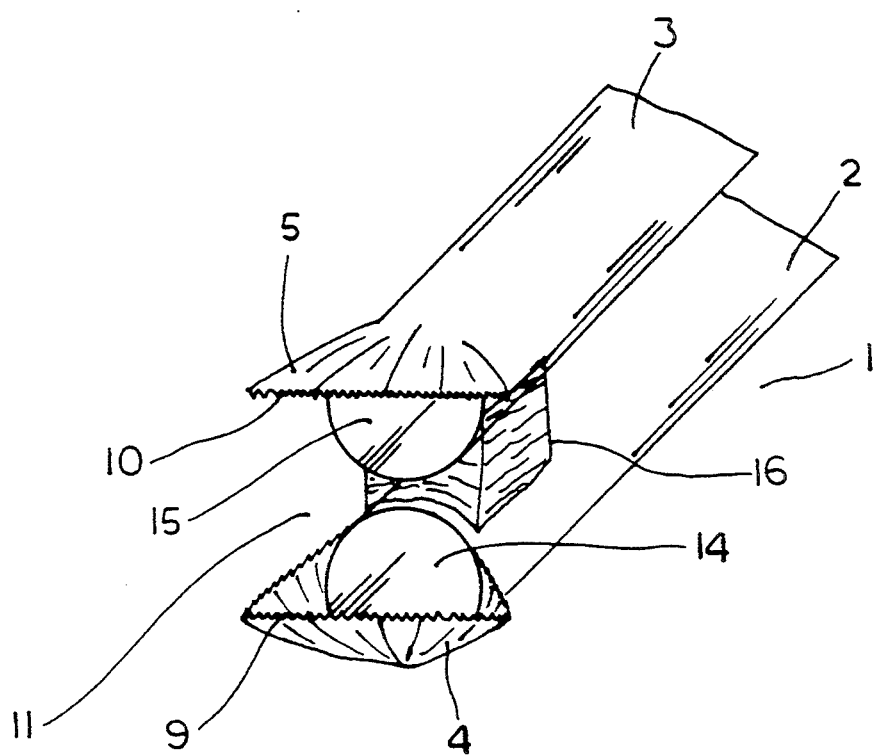
FIG. 3 is an enlarged orthographic view of the mouth portion of the lawn and gardening device showing the hollow poles, and the flexible spacing means.

Referring now to FIG. 3, an enlarged view is shown of the mouth portion of the lawn and gardening device 1 having a pair of poles 2 and 3. The poles 2 and 3 each have a jaw 4 and 5 affixed to the bottom end of each pole. The bottom end of both poles 2 and 3 has a flexible spacing means 16 which is a suitable solid flexible material of a given thickness and length being placed near the bottom at the jaws 4 and 5 and between poles 2 and 3, covered and held in place by the flexible coupler 6 shown in FIGS. 1 and 2 and separating poles 2 and 3 a given distance. The perimeter of jaws 4 and 5 has a row of jagged teeth 9 and 10 affixed thereto. The mouth 11 is in an open position thereby exposing the hollow interior 14 and 15 of poles 2 and 3 respectively.

Accordingly, a very unique, attractive, inexpensive apparatus is provided for a lawn and gardening device for use in extracting weeds, digging holes and planting seeds.

Since minor changes and modifications varied to fit particular operating requirements and environments will be understood by those skilled in the art, the invention is not considered limited to the specific examples chosen for purposes of illustration, and includes all changes and modifications which do not constitute a departure from the true spirit and scope of this invention as claimed in the following claims and reasonable equivalents to the claimed elements.

What is claimed is:

1. A lawn and gardening device for extracting weeds, planting seeds, and digging holes, the lawn and gardening device comprising:

(a) a pair of poles having a given length, a top end, a bottom end; and, (b) a pair of jaws affixed to each said bottom end of said poles, said jaws forming an open mouth when said poles are arranged in a parallel configuration, said jaws having a perimeter row of jagged teeth affixed thereto, said teeth of said jaws being able to interlock with each other, said jaws being non-symmetrical in size allowing one said jaw to slide into the other said jaw a given distance; and, (c) a flexible coupler means joining said poles at said bottom end, said flexible coupler means being adjacent to said jaws; and, (d) a flexible spacing means separating said poles a given distance, said flexible spacing means located between said poles, said flexible spacing means located inside said flexible coupler means; and, (e) at least one opening at said top end of at least one said pole; and, (f) a pair of handles affixed to said poles at said top end, whereby said mouth of said jaws may enclose a plant to be extracted, said mouth closing and extracting said plant when said handles are pulled apart, said plant being extracted from the ground when said handles are lifted in an upward fashion.

2. A lawn and gardening device as set forth in claim 1 wherein said flexible coupler means is non-corrosive, said flexible coupler means being able to pull said poles back to a parallel position when no force is applied to said handles.

3. A lawn and gardening device as set forth in claim 1 wherein said length of said poles is long enough to reach the waist of a user of any height whereby said user does not have to bend over.

4. A lawn and gardening device as set forth in claim 1 wherein said poles have a hollow center extending said length of said poles thereby providing a pathway for said seeds to fall from said opening to said mouth.

5. A lawn and gardening device as set forth in claim 1 wherein said handles are arranged in a substantially perpendicular configuration relative to said poles.

6. A lawn and gardening device as set forth in claim 1 wherein said handles extend horizontally outward when said poles are arranged in a parallel fashion.

7. A lawn and gardening device as set forth in claim 1 wherein said opening is large enough to allow seeds to be inserted therein.

* * * * *